J. P. WILSON.
Attachments to Ladies' Work-Tables.

No. 143,212. Patented September 23, 1873.

Witnesses:
Henry N. Miller
C. L. Evert

Inventor.
John P. Wilson,
per Alexander Mator
Attorneys.

UNITED STATES PATENT OFFICE.

JOHN P. WILSON, OF NEW YORK, N. Y.

IMPROVEMENT IN ATTACHMENTS FOR LADIES' WORK-TABLES.

Specification forming part of Letters Patent No. 143,212, dated September 23, 1873; application filed June 25, 1873.

*To all whom it may concern:*

Be it known that I, JOHN P. WILSON, of New York, in the county and State of New York, have invented certain new and useful Improvements in Attachment for Ladies' Work-Stand; and do hereby declare that the following is a full, clear, and exact description thereof, reference being had to the accompanying drawings and to the letters of reference marked thereon, making a part of this specification.

The nature of my invention consists in the construction and arrangement of an attachment for ladies' work-stands, as will be hereinafter more fully set forth.

In order to enable others skilled in the art to which my invention appertains to make and use the same, I will now proceed to describe its construction, referring to the annexed drawings, in which—

Figure 1:
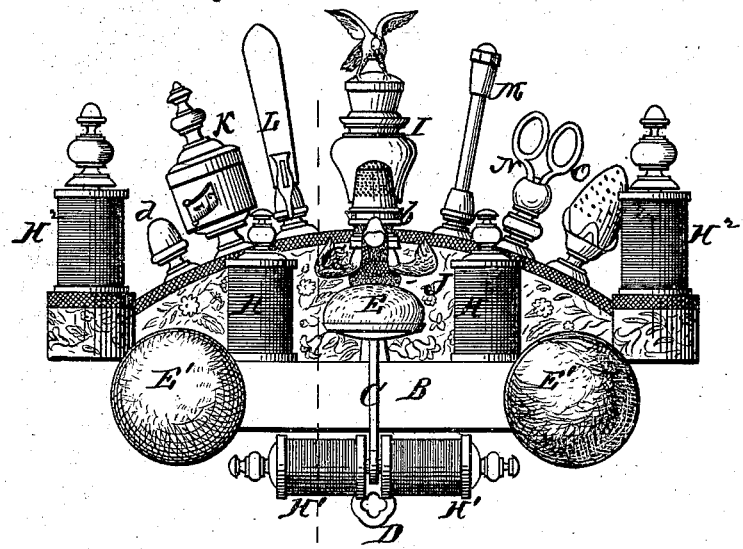
Figure 2:
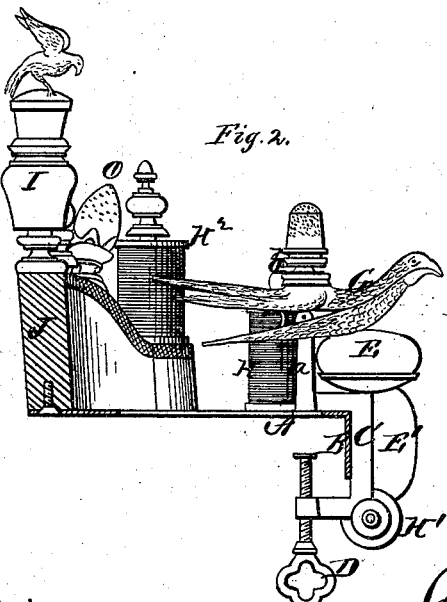

Figure 1 is a front view, and Fig. 2 a cross-section, of my invention.

A represents a bed-plate, with a front plate, B, along its front edge, said front plate extending downward from the bed-plate. In the center of these plates is a clamp, C, with screw D, to fasten the article to a work-table. On top of the clamp is a cushion, E, and at each end of the front plate is a similar cushion, E'. Back of the clamp C on the bed-plate A is a post, $a$, supporting on its upper end a bird, G, having its breast resting upon the cushion E. The upper half of this bird is hinged to the lower part with a spring between them, so as to hold the sewing in the beak. On each side of the bird G is a vertical spool, H, placed upon a tubular post, with a pin having an ornamental head inserted in said tube. At the lower front corner of the clamp C are similar but horizontal tubes, on which horizontal spools $H^1$ are placed. On top of the back of the bird G is a thimble-holder, $b$. Attached to the bed-plate A is a curved back, J, having at each end an offset or step, with a vertical spool, $H^2$. Between these offsets or steps at the ends the back J is curved, as shown in Fig. 1, and is, in the center, provided with a needle-case, I, the lid of which is provided with a bird with outstretched wings. Between the center needle-case I and the end spools $H^2$, are arranged, in any desired order, a thimble-holder, $d$, tape measure K, paper-folder L, with its holder, lead-pencil M with its holder, scissors and holder N, and emery-bag O, in the form of an acorn.

This attachment may be made of any suitable material, plain or ornamented in any desired manner, to present a neat and tasteful appearance.

Having thus fully described my invention, what I claim as new, and desire to secure by Letters Patent, is—

The within-described attachment for ladies' work-stand, consisting, essentially, of the bed-plate A, provided with the front clamp and the curved back J, carrying the several special devices, all substantially as described and shown, and for the purpose set forth.

In testimony that I claim the foregoing I have hereunto set my hand this 7th day of June, 1873.

JOHN P. WILSON.

Witnesses:
SAML. R. MYERS,
HENRY S. MOORE.